(12) United States Patent
Shahin (10) Patent No.: US 12,540,650 B2
(45) Date of Patent: Feb. 3, 2026

(54) BRAKE PAD HAVING SPACER THAT PROTRUDES RELATIVE TO A FRICTION MATERIAL LINING

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

( * ) Notice: Subject to any disclaimer, the term of this patent is extended or adjusted under 35 U.S.C. 154(b) by 387 days.

(21) Appl. No.: 18/301,309

(22) Filed: Apr. 17, 2023

(65) Prior Publication Data

US 2023/0332655 A1 Oct. 19, 2023

(51) Int. Cl.
*F16D 65/095* (2006.01)

(52) U.S. Cl.
CPC .... *F16D 65/095* (2013.01); *F16D 2250/0084* (2013.01)

(58) Field of Classification Search
CPC .............. F16D 65/095; F16D 2250/0084
USPC ........................................ 188/1.11 W, 73.1
See application file for complete search history.

(56) References Cited

U.S. PATENT DOCUMENTS

| | | | | |
|---|---|---|---|---|
| 3,473,631 A | * | 10/1969 | Schmid | F16D 55/22 188/71.1 |
| 3,534,835 A | * | 10/1970 | Meier | F16D 65/567 188/196 R |
| 5,284,227 A | * | 2/1994 | Pelfrey | F16D 65/847 192/70.15 |
| 6,932,199 B2 | * | 8/2005 | Emmett | F16D 65/0972 188/73.1 |
| 9,551,390 B2 | * | 1/2017 | Eichler | F16D 55/226 |
| 10,871,197 B2 | * | 12/2020 | Wilson | F16D 55/22 |

FOREIGN PATENT DOCUMENTS

| | | |
|---|---|---|
| DE | 2839342 A1 | 3/1980 |
| DE | 29615283 U | 1/1997 |
| DE | 102012102585 A1 | 9/2013 |
| EP | 3269993 B1 | 4/2020 |
| JP | H09112606 A | 5/1997 |
| JP | 5514160 B2 | 6/2014 |

OTHER PUBLICATIONS

DE OA Dated Mar. 8, 2023.

* cited by examiner

*Primary Examiner* — Christopher P Schwartz
(74) *Attorney, Agent, or Firm* — Harvest IP Law, LLP (57) ABSTRACT

The invention relates to brake pad having spacer that protrudes relative to a friction material lining, the brake pad comprising: a backplate; a friction material lining arranged on the backplate and having an outer face facing away from the backplate; and at least one spacer that protrudes relative to the outer face of the friction material lining.

14 Claims, 9 Drawing Sheets

BRAKE PAD HAVING SPACER THAT PROTRUDES RELATIVE TO A FRICTION MATERIAL LINING

CROSS-REFERENCE TO RELATED APPLICATION

This application is based on and claims priority under 35 U.S.C. § 119 to German Patent Application No. 102022203847.9, filed on Apr. 19, 2022 in the German Patent and Trade Mark Office, the disclosures of which are incorporated herein by reference.

TECHNICAL FIELD

The invention relates to a brake pad for a vehicle disc brake, a vehicle disc brake arrangement and a method for producing a brake pad. The vehicle may be a road vehicle, such as a car, a truck or a bus.

BACKGROUND

In vehicle disc brakes, brake pads are movable members that carry a brake lining made of a friction material and that are selectively pressed into contact with a brake disc to generate brake forces. The brake pads typically comprise a rigid backplate, e.g. made of steel or cast iron. A layer of friction material or, in other words, a lining of friction material is arranged on and carried by the backplate. Optionally, so-called underlayers may be provided in between the backplate and the friction material lining, e.g. to dampen vibrations.

A known problem in existing vehicle disc brakes is the generation of so-called drag torque. This occurs when the brake pad comes into or stays in contact with the brake disc, even though the brake is not activated. Possible causes may be thermal or elastic deformations of the components of the vehicle disc brake. Also, suction forces generated by an air flow in between the brake pad and brake disc may occur. Still further, brake pad resetting means that are supposed to reliably lift the brake pad off of the brake pad after braking can fail. As a result, undesired brake forces are generated which cause excess fuel or electric energy consumption, increase brake pad wear and possibly generate noise or vibrations.

A number of technologies exist attempting to limit the risk and extent of drag torque generation. For example, EP 3 269 993 B1 discloses a readjusting device for reliably moving a caliper back to its initial position when the disc brake is in a release position of a disc brake after braking, the readjusting device comprising at least one active force generating unit. This solution involves additional actuators, thus increasing costs and complexity.

Other solutions focus on providing reliable brake pad resetting means, e.g. in form of resetting springs or brake piston seals having a resetting function. Such solutions may not always be reliable and can equally increase the costs and complexity of the vehicle disc brake.

SUMMARY

Therefore, it is an object of this disclosure to lower the risk of drag torque in vehicle disc brakes at low costs and low complexity, but with sufficient reliability.

This object is solved by the subject matter according to the independent claims. Preferred embodiments are set out in this description and in the dependent claims.

Accordingly, a brake pad for a vehicle disc brake arrangement is disclosed, the brake pad including:
 a backplate;
 a friction material lining arranged on the backplate and having an outer face facing away from the backplate; and
 at least one spacer that protrudes relative to the outer face of the friction material lining.

The backplate may be a substantially planar and/or rigid member. It may be made of a metallic material, in particular of steel. It may be arrangeable in a brake caliper of the vehicle disc brake arrangement. For doing so, it may have a guiding protrusions on two opposite sides, said guiding protrusions being arrangeable in guiding recesses provided in the brake caliper.

The backplate may be arrangeable in parallel to a side face of the brake disc with which the brake pad is to be brought into contact. The backplate may, when arranged in a vehicle disc brake arrangement, face away from the brake disc. The backplate may receive a pressing force from a brake piston or from the brake caliper (in particular when configured as a floating caliper). This may press the brake pad and in particular the friction material lining into contact with the brake disc.

The friction material lining may be adhered to and/or mechanically fixed to the backplate (or to an underlayer provided in between the backplate and the friction material lining). The friction material of said lining may be homogeneous, i.e. the lining may have a homogeneous material composition. The friction material may be different from a material of the backplate and/or the underlayer. For example, it may comprise friction fibers or friction particles (e.g. metallic particles) and a binder. Accordingly, the friction material may be or comprise a material composition with particles and/or fibers distributed in a (rigid) binder material.

The outer face of the friction material lining may be fully or largely planar, e.g. apart from optional chamfers or recesses for receiving the spacer as discussed below. Generally, it may comprise grooves, recess or chamfers that deviate from a main plane. That is, the majority of the surface area of the outer face (e.g. more than 80%) may extend in a main plane, whereas part of the surface area comprising optional grooves, recesses or chamfers may deviate from said main plane. The main plane may define an outermost surface of the friction material lining for contacting the brake disc, whereas the grooves, recess or chamfers may define indentations in said main plane. The main plane may generally be smooth and/or non-curved.

The spacer may protrude relative to the outer face and/or to the above main plane and towards a side face of the brake disc that is to be contacted for generating braking forces. A (front) face of the spacer facing the brake disc may have a surface area that is considerably smaller than the surface area of the outer face (see below).

By providing a respective spacer, the friction material lining may remain at a distance to the brake disc. This way, a desired air gap between the friction material lining and the brake disc can be established for preventing drag torque. For example, while the spacer might contact the brake disc, the friction material lining and in particular its outer face may remain at a distance thereto due to the spacer protruding relative to the friction material lining. Thus, even if an undesired contact between the brake pad and the brake disc occurs when not actually braking, the brake disc may only be contacted by the spaces, not necessarily by the complete outer face of the friction material lining.

On the other hand, when braking, the spacers may elastically deflect and/or the protruding portions may deliberately be worn out and removed. As a result, the friction material lining gets into full contact with the brake disc to securely generate brake forces.

Advantageously, it has been determined that the spacers tend to thermally expand more than the outer face of the friction material lining, in particular in a direction towards the brake disc. Several embodiments are disclosed herein for promoting such an increased thermal expansion. Yet, it has been observed that even when configuring the spacers and the friction material lining of an identical material, the spacers tend to thermally expand more than the friction material lining. This can particular the observed when, as an optional general feature, the spacers are provided with a smaller material volume then the friction material lining. The reduced material volume promotes an increase in temperature throughout the complete volume of the spacer, thus accelerating its thermal expansion.

Accordingly, even when wearing out an initially protruding portion of the spacers during a braking action, the spacers may return to a protruding configuration due to thermally expanding towards the brake disc, said expansion in particular exceeding that of the friction material lining. The protruding configuration may include any of the protruding distances mentioned herein.

Thus, at least after a succession of several brake actions which heat up the brake pad, the spacing function of the spacers may be restored, thereby again limiting the risk and/or extent of drag torque.

Additionally or alternatively, the spacers may elastically deflect or kink during braking to allow full contact between the brake disc and outer face of the friction material lining. Afterwards, they may return to their initial undeflected and protruding configuration.

In summary, the spacer may generally be configured to reduce its protrusion relative to the outer face during braking (e.g. due to being deflected and/or at least partially abraded) and to return to a protruding configuration afterwards, e.g. after this or a subsequent braking action. For example, this return may take place with a certain delay or after number of intermediate brake actions, e.g. until a sufficient amount of heat is generated for the spacer to thermally expand.

According to one example, the at least one spacer protrudes along an axis extending orthogonally to at least one of the outer face the friction material lining and the backplate. Especially when the spacer is an elongated member its longitudinal axis and/or the spacer as such may be oriented orthogonally to the outer face and/or to the backplate. This is particularly efficient for providing the spacing function and restoring it after the spacer's protruding portion is temporarily worn out.

Accordingly, in one aspect the spacer is elongated and/or has a cylindrical shape. For example, the spacer may be a pin or pin-shaped.

In one aspect, the spacer protrudes by at least 0.05 mm relative to the outer face of the friction material lining (and in particular towards the brake disc). Alternatively, the protrudes by at least 0.1 mm relative to the outer face of the friction material lining (and in particular towards the brake disc). The other hand, it may not protrude by more than 0.2 mm or more than 0.15 mm relative to the outer face of the friction material lining (and in particular towards the brake disc) to prevent a negative impact on pedal feel. If providing an arbitrarily large protrusion, a respectively large distance needs to be bridged during braking which may cause a delayed braking feel.

According to one example, the spacer extends through the friction material lining. Put differently and e.g. when looking at the outer face, the friction material lining may enclose the spacer and/or the friction material and the spacer may overlap. For example, an outline of the friction material lining may enclose and/or encircle the spacer. Accordingly, the spacer may form a local breakthrough through the friction material lining and/or extend through a local recess and in particular a through hole within the friction material lining. In other words, the spacer may be immersed or embedded in the friction material lining, but still protrude therefrom. This increases compactness and allows for the spacer to be positioned as needed for reliably preventing drag torque. According to further embodiment, an area of a front face of the spacer facing away from the outer face of the friction material lining is smaller than 10% of the area of said outer face and in particular less than 1% of the area of said outer face. Thus, the extent of drag torque caused by the spacer remaining or getting into contact with the brake disc is considerably smaller than a hypothetical drag torque resulting from the outer face of the friction material lining contacting the brake disc. This also holds true when optionally providing a plurality of spacers.

As noted above, the spacer may be configured of the same material as the friction material layer. In particular to promote a return to its protruding configuration after being initially worn out, the spacer may alternatively comprise a material that is different from a material of the friction material lining.

For example, the material of the spacer may have a higher E-modulus (e.g. at least twice as high) compared to the friction material. This way, it may reliably elastically deflect during braking to bring the friction material lining into contact with the brake disc. Also, it may reliably return to its protruding configuration after braking.

Additionally or alternatively, the material of the spacer may have a higher coefficient of thermal expansion than the material of the friction material lining (e.g. at least twice or at least three times as high). In consequence, with increased frictional heat generation, e.g. occurring at latest after a succession of several brake activations, and during a period without brake activation, the spacers may thermally expand to again protrude out of the friction material lining. This may at least partially compensate for a previously protruding portion being worn out.

The spacer may generally have a homogenous material composition. It may comprise a plastic material, e.g. a thermoplastic or a duroplastic material.

Additionally or alternatively, the spacer may comprise a composite material, in particular a fibre reinforced material. The fibres may e.g. be glass fibres, aramid fibres or carbon fibres.

Additionally or alternatively, the spacer may comprise a metallic alloy, in particular comprising at least one of aluminium, zinc and magnesium. Such alloys may have a significantly larger coefficient of thermal expansion compared to the friction material.

Additionally or alternatively, the spacer may comprise a material having a higher weight percentage of metallic components than the material of the friction material lining. This way, the coefficient of thermal expansion of the spacer can be increased compared to the friction material lining.

In one example, the spacer is connected and in particular fixed to the backplate and/or to an underlayer that is arranged in between the backplate and the friction material lining. For example, a least a base portion of the spacer may be held in position by said connection. Apart from said connection, the spacer may extend freely through the friction material lining and/or not be connected or fixed to further components of the brake pad (especially the friction material lining). This provides a sufficient degree of freedom for the spacer to move and in particular deflect and/or expand relative to the friction material lining.

Nonetheless, at least part of an outer surface (in particular a circumferential surface) of the spacer may contact the friction material layer without, however, being fixed thereto. For example, it may contact a surface of an optional enclosing recess discussed below. Thus, the spacer may e.g. glide along a surrounding or enclosing surface of the friction material lining during its deflection and/or its thermal expansion.

According to a further embodiment, the spacer extends through a recess and in a particular a through hole provided in the friction material lining. The recess may extend from the outer face of the friction material lining to an opposite (e.g. inner face) of the friction material lining facing the backplate. It may thus define a free space enclosing and/or receiving the spacer. When configured as a through hole, said through hole may be cylindrical and/or extend orthogonally to the outer face and/or to the backplate. The spacer may be concentrically received in the through hole and/or extend along its longitudinal axis.

In this manner, the spacer may be positioned essentially anywhere within the outer face of the friction material lining. This allows for positioning the spacer at any position that is suitable for reliably providing its spacing function.

The brake pad may comprise a plurality of spacers, e.g. between two and twenty or two and ten. These spacers may be distributed regularly (e.g. at equal distances from one another and/or at equal distances to a closest outer edge of the friction material lining). In one example, the spacers are positioned adjacent to at least two different and in particular opposite edges of the outer face (e.g. a top and bottom edge or left and right edge).

By providing a respective plurality of spacers and in particular when distributing them in the above manner, an air gap between the friction material lining and the brake disc can reliably be established and maintained. For example, the plurality of spacers may prevent the brake pad from tilting relative to the brake disc. Thus, a risk of the friction material lining contacting the brake disc as a result of such a hypothetical tilting can be limited.

The invention also concerns a vehicle disc brake arrangement, having:
a brake disc; and
at least one brake pad according to any of the previous aspects.

The brake pad may be arranged so that the outer face of the friction material lining faces the brake disc. The brake pad may be configured to contact the brake disc with its outer face. The vehicle disc brake arrangement may also comprise a brake caliper. The brake caliper may carry the brake pad and e.g. guide it when said brake pad is moved towards and away from the brake disc. The vehicle disc brake arrangement may comprise an (e.g. hydraulic or electric) actuator for selectively pressing the brake pad against the brake disc.

The invention also relates to a method for producing a brake pad according to any of the aspects disclosed herein, the method including:
arranging a friction material lining on a backplate, the friction material lining having an outer face facing away from the backplate; and
providing at least one spacer that protrudes relative to the outer face of the friction material lining.

The above list does not necessarily define a fixed sequence of steps that are carried out one after the other, even though this may be implemented accordingly. Rather, the arranging of the friction material lining and the provision of the spacer may at least partially timely overlap and/or be carried out at least partially simultaneously. For example, the spacer may initially be provided at and e.g. fixed to the backplate and/or to an underlayer provided at the backplate. Thus, arranging the friction material lining at such a backplate may include or directly result in providing spacers protruding relative to and in particular through the friction material lining.

In another variant, the sequence of providing the spacer and arranging the friction material lining may be reversed. For example, the at least one spacer may individually or when connected to an underlayer be connected to the friction material lining first. This may include forming the protrusion of the spacer. Afterwards, the pre-mounted unit of friction material lining and spacer (and optionally the underlayer) may jointly be arranged on the backplate.

BRIEF DESCRIPTION OF DRAWINGS

Embodiments of the invention are discussed below with reference to the attached schematic figures. Same or similar features may be marked with same reference signs throughout the figures.

DETAILED DESCRIPTION

Figure 1:
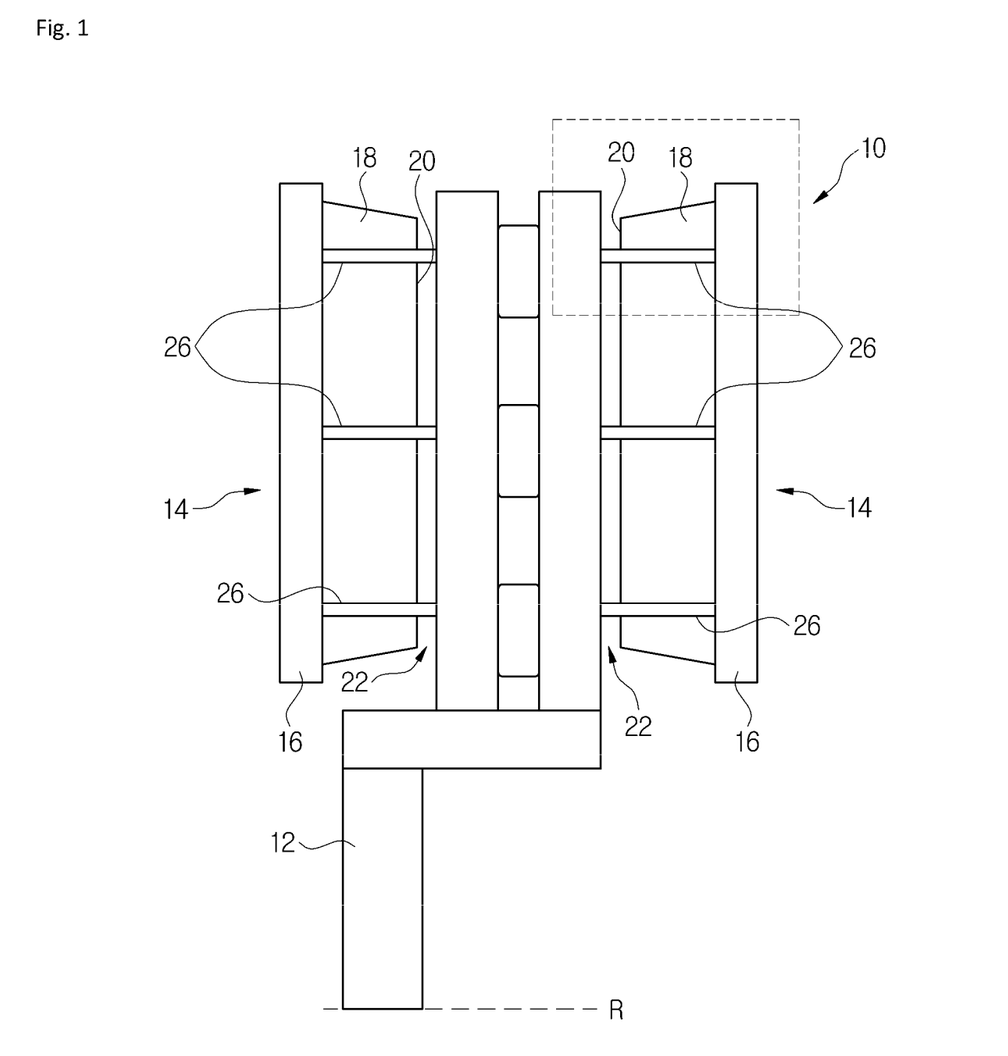
FIG. 1 is a schematic sectional view of a vehicle disc brake arrangement according to an embodiment of the invention and comprising a brake pad according to the invention.

FIG. 1 shows a vehicle disc brake arrangement 10 according to an embodiment of the invention. The vehicle disc brake arrangement 10 comprises a brake disc 12 that rotates about a rotational axis R. Only an upper half of the brake disc 12 is shown. The vehicle disc brake arrangement 10 also comprises a pair of brake pads 14. In a generally known manner, these are arranged on opposite sides of the brake disc 12 (one brake pad 14 on each side). Accordingly, they can be brought into contact with opposite side faces of the brake disc 12 and clamp the rotating brake disc 12 in between them for generating a brake force.

The brake pads 12 each comprise a rigid and planar backplate 16. At a face of the backplate 16 facing the brake disc 12, a friction material lining 18 is provided. The friction material lining 18 has a material composition according to known prior art solutions. An outer face 20 of each friction material lining faces a respectively adjacent side face of the brake disc 12. FIG. 1 shows a non-braking state in which the outer faces 20 do not contact the side faces. Instead, an air gap 22 of e.g. at least 0.1 mm is provided between each outer face 20 and the brake disc 12.

Each brake pad 12 also comprises a plurality of spacers 26. The spacers 26 are configured as elongated cylindrical pins having a circular cross-section. The spacers 26 are connected and in particular mechanically fixed and/or welded or glued to the backplate 16 (or to an underlayer 28 between the backplate 16 and the friction material lining 18, said underlayer 28 not being visible in FIG. 1 but in FIG. 2). The spacers 26 extend orthogonally to a plane of the backplate 16. Also, they extend in parallel to the rotation axis R.

The spacers 26 each extend in and along through holes in the friction material lining and are thus surrounded and/or enclosed by the friction material. Yet, a gap may be provided between an inner surface of each through hole and the spacer 26 received therein to allow for a relative movement between these members. Alternatively, the inner surface of the through holes may be coated with a material that is different from the friction material and optionally has a lower friction coefficient.

Figure 2:
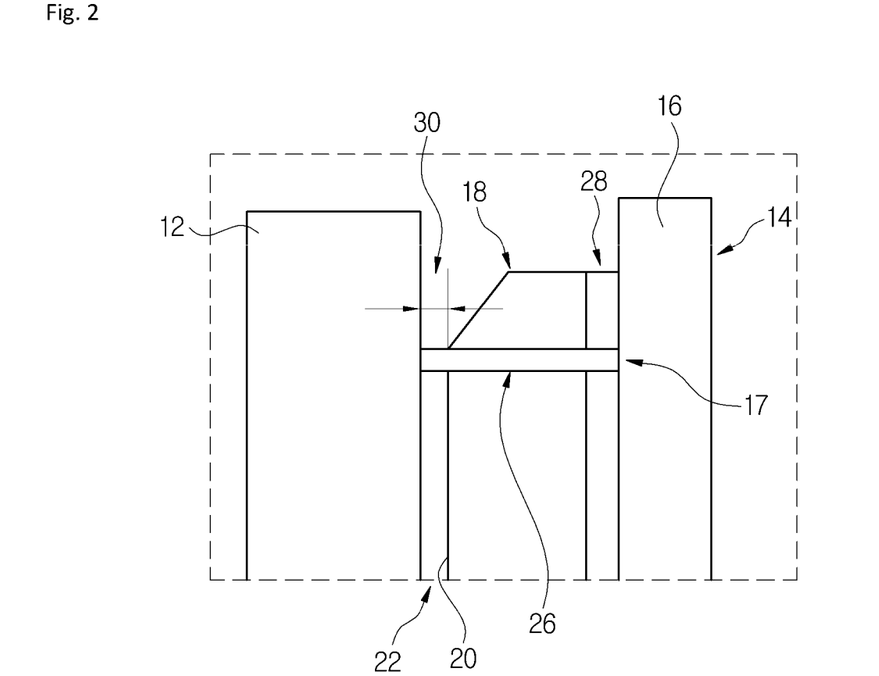
FIG. 2 is a detail view of FIG. 1.

FIG. 2 shows an enlarged schematic view of the portion enclosed by a dotted line in FIG. 1. In this view the optional underlayer 28 is visible. Also, it can again be seen that the spacer 26 and more specifically a base portion 17 thereof is fixed to the back plate 16. The spacer 26 protrudes relative to the outer face 20 of the friction material lining 18 and towards the adjacent side face of the brake disc 12. At its upper left corner, the friction material lining 18 has a chamfer. This is merely optional and thus not indicated accordingly in FIG. 1.

FIG. 2 shows the non-braking state of the vehicle disc brake arrangement 10. Yet, while FIG. 1 indicates that the spacers 26 may remain at a distance from the disc brake 12 in a said non-braking state, FIG. 2 shows that a protruding front portion 30 of the spacers may also contact the brake disc 12. This results in forming a minimum air gap 22 between the outer face 20 and the brake disc 12, an axial width of said air gap 22 corresponding to the axial protrusion lengths of the protruding front portion 30.

Thus, even if suction forces and/or thermal or elastic deformations begin to reduce an initially present gap 22 in the nonbreaking state, the spacers 26 ensure that an air gap 22 with said minimum dimensions is still maintained.

It may also be provided that the spacers 26 are in permanent contact with the brake disc 12 (e.g. due resetting forces of resetting means acting on a brake pad 14). These non-braking contact forces may, however, not cause significant abrasion of the spacers 26.

The contact between the disc brake 12 and a front face of the protruding front portions 30 generates drag torque. However, due to the considerably smaller surface area of said front face compared to the outer face 20, this drag torque is very low and thus acceptable.

When activating the brake, the brake pads 14 are forced against the brake disc 12 with significant pressure. Accordingly, contact forces between a front face of the protruding front portions 30 of each spacer 26 and the brake disc 12 increases. This means that said portions 30 begin to be abraded or, put differently, are worn out. Thus, the outer face 20 of each brake pad 14 can come into contact with the disc brake 12 to significantly increase the generated frictional forces and provide the desired braking effect.

During braking, heat is generated, in particular when braking with large forces over longer periods of time or when successively braking several times. As a result, a temperature of the friction material lining 18 and of the spacers 26 increases.

In the shown example, the spacers 26 comprise a material that is different from the friction material and has a higher coefficient of thermal expansion. Thus, the spacers 26 begin to thermally expand to a larger extent than the friction material e.g. once braking stops over a longer period of time. This way, they restore at least part of the protruding front portion 30, so that the initial spacing effect during non-braking is re-established.

Generally, in addition or as an alternative to abrading the protruding front portion 30, the spacers 26 may elastically deflect and in particular kink during braking. For doing so, a respectively large free space may be provided around them (i.e. a respectively large distance to the inner surfaces of surrounding through holes in the friction material lining 18). This space and/or this distance may be dimensioned to accommodate the spacers 26 also in their deformed or kinked configuration.

In this case, the protruding front portion 30 retracts to be flush with the outer face 20, so that the outer face 20 contacts the brake disc 12. Once the brake is released, the brake pad 14 is reset into its non-braking position by known resetting means and the spacers 26 return to their non-deformed or non-kinked state. This includes restoring the protruding front portions 30 to assume the state of e.g. FIG. 2.

Figure 3:
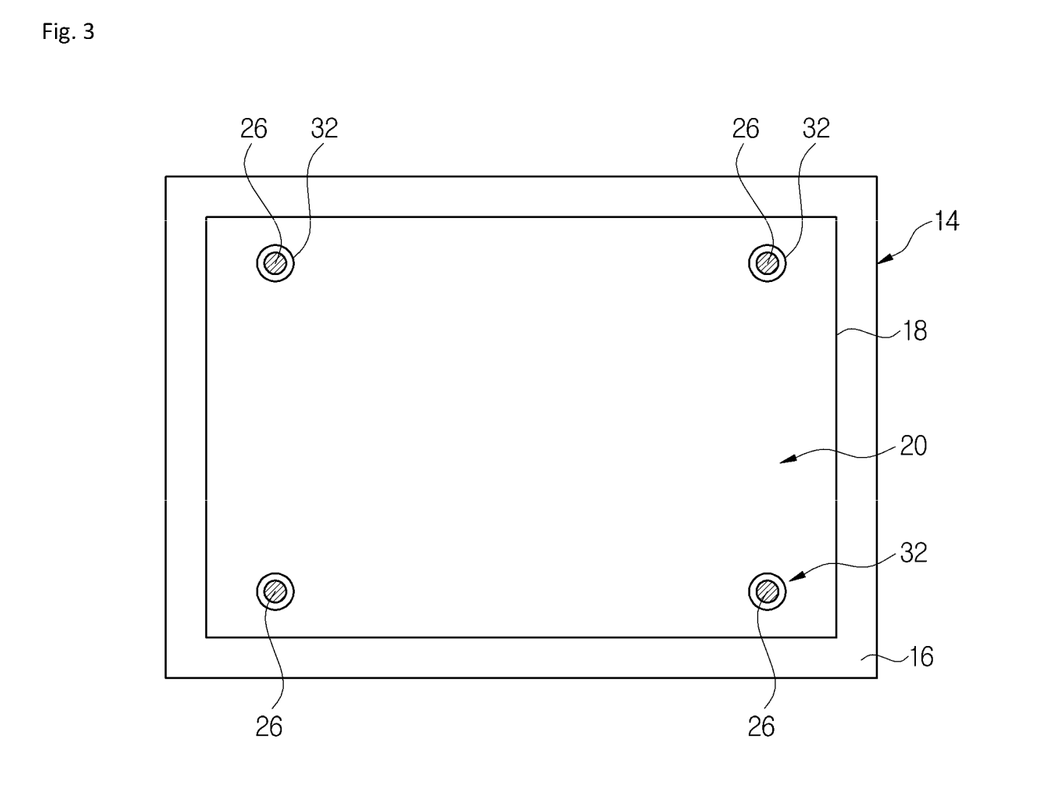
FIG. 3 is front view of a brake pad according to a further embodiment of the invention.
Figure 4:
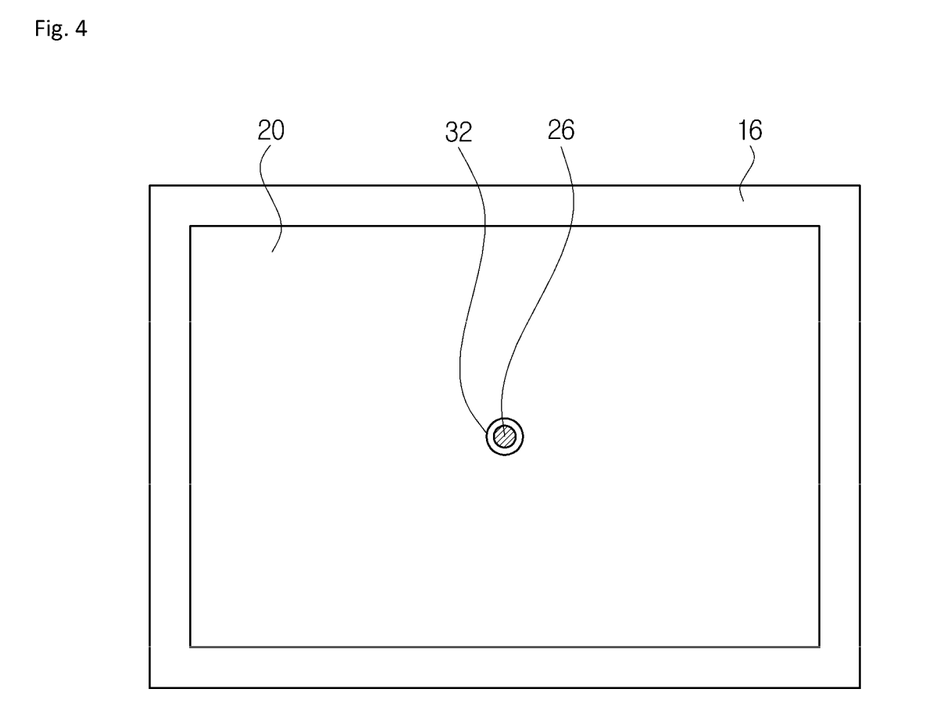
FIGS. 4-9 are front views similar to FIG. 3 of brake pads according to further embodiments of the invention.
Figure 5:
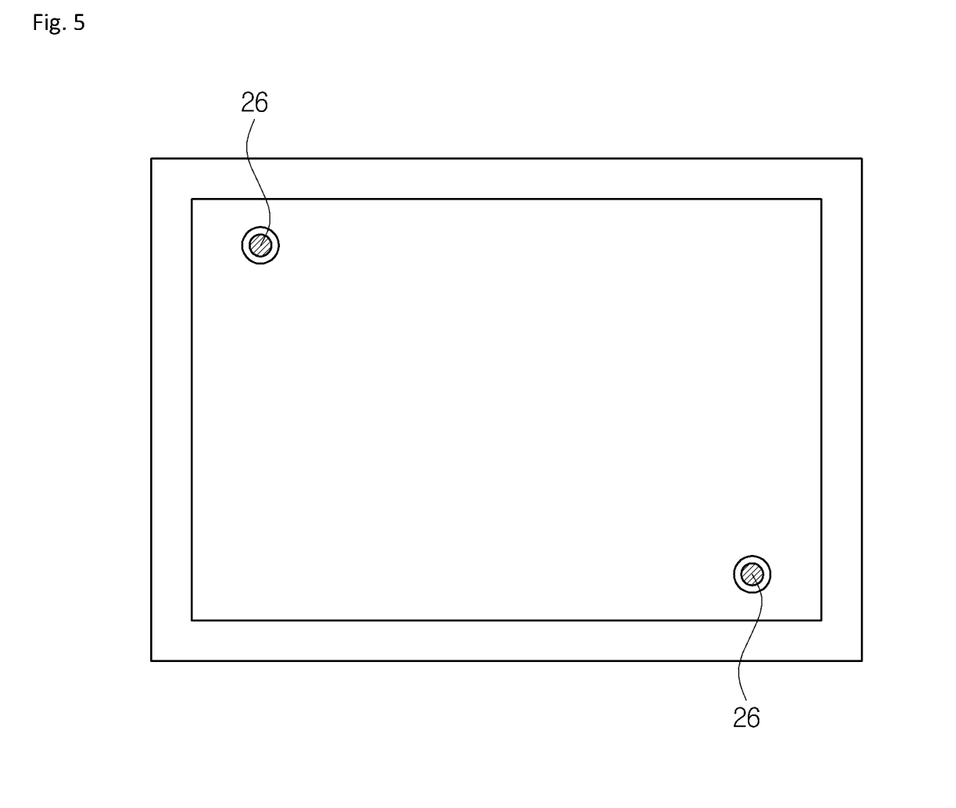
Figure 6:
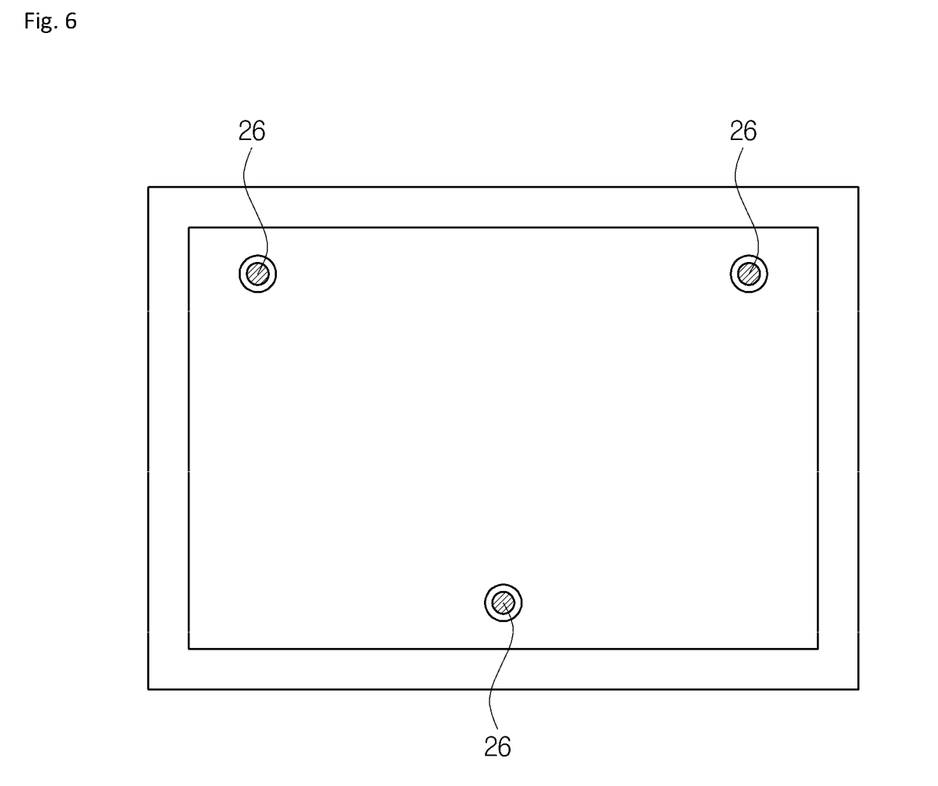
Figure 7:
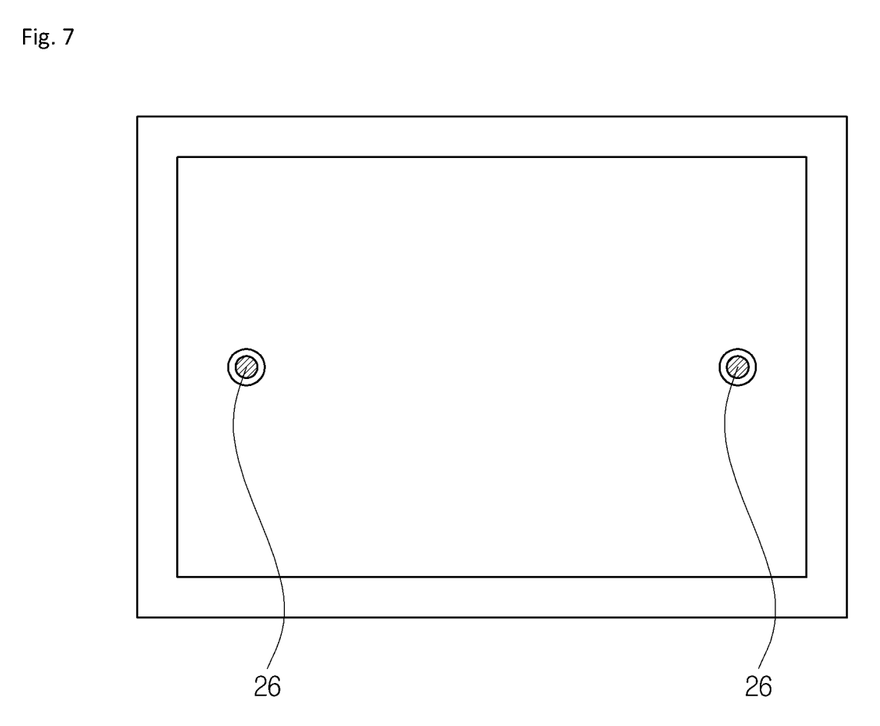
Figure 8:
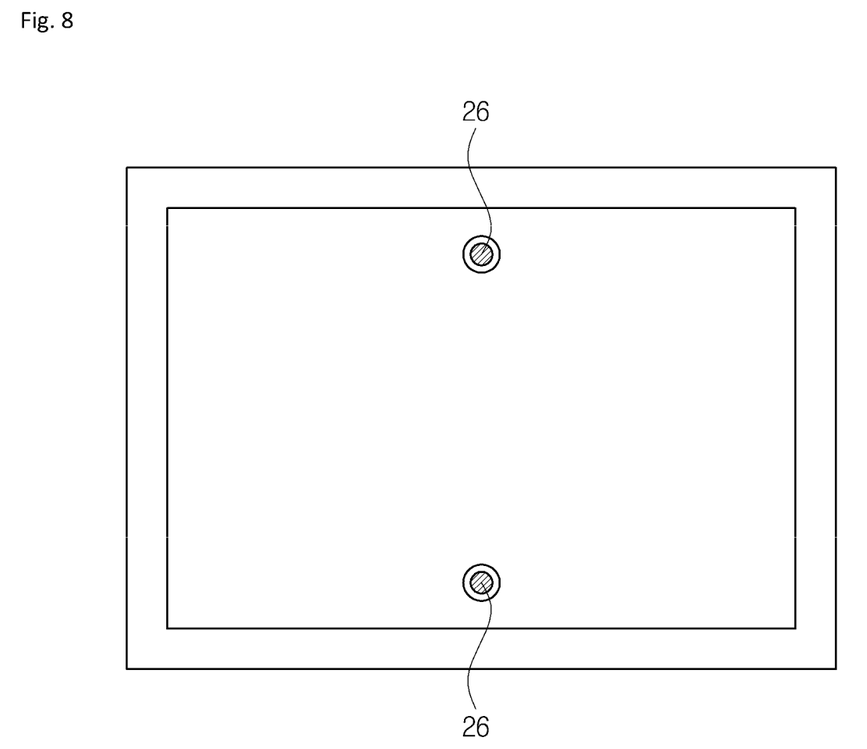
Figure 9:
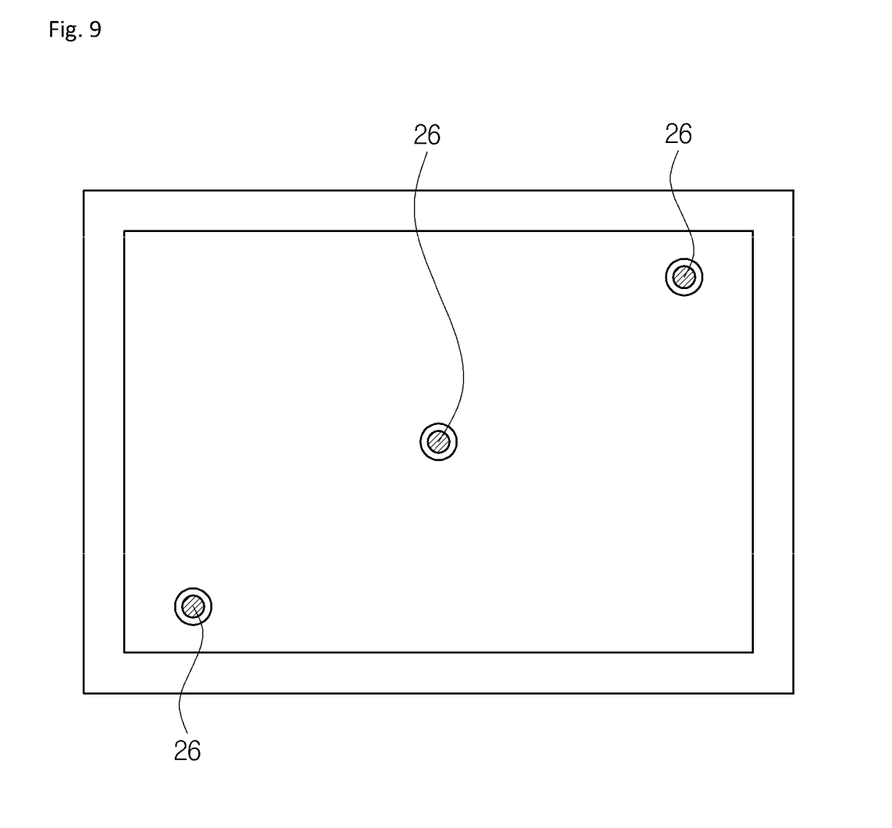

FIG. 3 shows a front view of a brake pad 14 according to a further embodiment of the invention. As an example, the brake pad 14 and specifically its backplate 16 has a rectangular shape. The friction material lining 22 has a similar rectangular shape but is dimensioned with a smaller surface area and footprint. The brake pad 14 comprises four spacers 26. These are distributed in corner regions of the friction material lining 18. Further, they overlap with the footprint of the friction material lining 18 or, put differently, are arranged within said footprint.

By arranging the spacers 26 accordingly, a spacer 26 is provided near each left and right edge and upper and lower edge of the friction material lining 18. Thus, the spacers 26 may provide a constant spacing function across the friction material lining 18. This prevents a risk of the friction material lining 18 tilting towards and thus contacting the brake disc 12.

FIG. 3 also shows a configuration in which through holes 32 are provided in the friction material lining 18 which each receive a spacer 26. A diameter of the through holes 32 is larger than a diameter of the cross-section of the spacers 26. This promotes a relative movement between the spacers 26 and friction material lining 18 (e.g. as a result of thermal expansion or elastic deformation). Additionally or alternatively, this allows for providing an elastic and/or low-friction material lining 18 in between the friction material lining and the spacers 26 (e.g. in between the outer surface of the spacers 26 and the inner surface of the through holes 32).

FIGS. 4-9 are views similar to FIG. 3 and each show further possible distributions of spacers 26 (and optional through holes 32) within the outer face 20 of the friction material lining 18. These figures illustrate the degree of freedom for arranging the spacers 26 and/or choosing their number to reliably provide the desired spacing function.

What is claimed is:

1. A brake pad for a vehicle disc brake arrangement, the brake pad including:
    a backplate;
    a friction material lining arranged on the backplate and having an outer face facing away from the backplate; and
    at least one spacer that protrudes relative to the outer face of the friction material lining, wherein the space extends through a through hole provided in the friction material lining, wherein a free space is formed between the spacer and an inner surface of the through hole.

2. The brake pad according to claim 1,
wherein the spacer is configured to reduce its protrusion relative to the outer face during braking and to return to a protruding configuration afterwards.

3. The brake pad according to claim 1,
wherein the spacer protrudes along an axis extending orthogonally to at least one of the outer face and the backplate.

4. The brake pad according to claim 1,
wherein the spacer protrudes by at least 0; 05 mm relative to the outer face of the friction material lining.

5. The brake pad according to claim 1,
wherein the spacer extends through the friction material lining.

6. The brake pad according to claim 1,
wherein the spacer is elongated and/or has a cylindrical shape.

7. The brake pad according to claim 1,
wherein the area of a front face of the spacer facing away from the outer face of the friction material lining is smaller than 10% of the area of said outer face.

8. The brake pad according to claim 1,
wherein the spacer comprises a material that is different from a material of the friction material lining.

9. The brake pad according to claim 8,
wherein the material of the spacer has a higher coefficient of thermal expansion than the material of the friction material lining.

10. The brake pad according to claim 1,
wherein the spacer comprises at least one of the following materials:
a plastic material;
a fiber reinforced material, in particular a fiber reinforced plastic;
a material having a higher weight percentage of metallic components than the material of the friction material lining;
a metallic alloy, in particular comprising at least one of aluminium, zinc and magnesium.

11. The brake pad according to claim 1,
wherein the spacer is connected to the backplate and/or to an underlayer that is arranged between the backplate and the friction material lining.

12. The brake pad according to claim 1,
wherein a plurality of spacers is provided that are positioned adjacent to at least two different edges of the outer face.

13. Vehicle disc brake arrangement, having:
a brake disc; and
at least one brake pad according to claim 1.

14. Method for producing a brake pad, the method including:
arranging a friction material lining on a backplate, the friction material lining having an outer face facing away from the backplate; and
providing at least one spacer that protrudes relative to the outer face of the friction material lining, wherein the spacer extends through a through hole provided in the friction material lining and a free space is formed between the spacer and an inner surface of the through hole.

* * * * *